United States Patent [19]

Bleckmann

[11] 4,040,677
[45] Aug. 9, 1977

[54] DEVICE FOR UTILIZATION IN ANTI-SKID CONTROL SYSTEMS

[75] Inventor: Hans-Wilhelm Bleckmann, Frankfurt am Main, Germany

[73] Assignee: ITT Industries, Incorporated, New York, N.Y.

[21] Appl. No.: 681,926

[22] Filed: Apr. 30, 1976

[30] Foreign Application Priority Data

May 3, 1975 Germany .............................. 2519866

[51] Int. Cl.$^2$ .............................................. B60T 8/02
[52] U.S. Cl. ..................................... 303/95; 303/109; 303/91; 235/151.32; 361/238
[58] Field of Search ................... 303/91, 95, 106, 109, 303/20; 235/150.2, 151.32; 317/5

[56] References Cited

U.S. PATENT DOCUMENTS

| 3,746,925 | 7/1973 | Schaepman | 317/5 |
|---|---|---|---|
| 3,838,889 | 10/1974 | Miller | 303/109 |

*Primary Examiner*—Stephen G. Kunin
*Assistant Examiner*—Reinhard J. Eisenzopf
*Attorney, Agent, or Firm*—John T. O'Halloran; Alfred C. Hill

[57] ABSTRACT

This invention discloses a device for converting the rate of a pulse train which is proportional to the velocity of a vehicle wheel into a binary number for use in a digital computer for anti-skid control systems wherein the pulse train is supplied to a comparator, the output of the comparator being coupled to the input of a storage register which cumulatively adds to its contents, taking due consideration of the sign of the input. A frequency generator which is controlled by the contents of the storage register, with the comparison pulse train produced by the generator being supplied to the comparator and an adapter being added to establish a difference between the frequencies of the two pulse trains in the form of a binary number, which binary number is supplied to said register so that the content of said register represents the binary number corresponding to the frequency. The comparator and the register are both controlled by a clock pulse generator.

10 Claims, 3 Drawing Figures

Fig. 1

DEVICE FOR UTILIZATION IN ANTI-SKID CONTROL SYSTEMS

BACKGROUND OF THE INVENTION

1. Field of the Invention

A device for converting the rate of a pulse train which is proportional to the rotational velocity of the vehicle wheel into a binary number.

2. Prior Art

In any accurate anti-skid control system there always exists the problem of converting the rotational velocity of a wheel which is measured as a pulse train into a signal useful for controlling the brake pressure. The rate of the pulse train is proportional to the rotational velocity. As a rule, this method involves a computing process having many steps and the inaccuracies occurring in prior art devices using analog elements are often relatively high, so that these analog devices cannot fully solve the problem. Furthermore, analog modules are in general relatively expensive. Therefore, anti-skid control have already been devised for operation of digital computers. For example an anti-skid control device is disclosed in U.S. Pat. No. 3,746,925, assigned to the same assignee of this application. In the device therein disclosed the pulses arriving from a wheel sensor are counted over two successive like intervals and compared with one another so that the difference between the number of pulses counted for successive intervals is indicative of the acceleration of the wheel. It will be obvious from this that the interval must be substantially longer than a period of the slowest pulse rate of this pulse train. Therefore, there is a relatively long time before a value indicating the rotational acceleration of the wheel will be available. For that reason alone a quick responding and thus accurate anti-skid control is not possible.

In U.S. Pat. No. 3,805,089, a device of the type previously referred to is disclosed in which each pulse arriving from the wheel sensor corrects a binary number which is representative of the rotational velocity. This is disclosed as being achieved in that initially when a pulse arrives, the contents of a first register are compared to a predetermined value. The difference between the two values is transferred to a second register which adds this difference to its content, taking into consideration the sign. The content of the second register are then read into the first register at a constant high rate, in other words added to the value already held in the first register. When comparing the contents of the second register with the predetermined value, the second register is simultaneously reset to zero. It results from such a feedback arrangement of the difference determined by the comparator through the two registers that this difference is indicative of the rotational acceleration of the wheel. Since the second register operates in the manner of an integrator, its binary contents represent the instantaneous wheel velocity. Consequently, this arrangement provides at all times a binary number representative of the rotational velocity which is corrected upon the arrival of each new pulse.

However, in the arrangement of U.S. Pat. No. 3,805,089, there are decisive disadvantages. In the event of a sudden wheel lock-up the pulse rate will go down to zero so that no signal will appear at the comparator to trigger the comparison function. In this case it will not be possible to determine the difference between the contents of the first register and the predetermined value so that the contents of the second register cannot be corrected. The second register would thus continue to deliver to the connected computer a signal indicative of the immediately preceding rotational velocity of the wheel, although the wheel has stopped rotating. At the same time the contents of the first register would continue to be incremented until it overflows. Accordingly, the device disclosed in U.S. Pat. No. 3,805,089 does not provide an accurate means to determine the rotational velocity of the wheel. In other words, the contents of the second register for a subsequent anti-skid control or the like but only provides means to average the difference obtained by the comparator and representing the wheel deceleration by means of a third register over a predetermined interval and to use it further. Thus, this disclosed prior art device does not permit the use of the signal which normally indicates the rotational velocity of the wheel because of the above-described case, which is just the critical case in anti-skid control systems.

SUMMARY OF THE INVENTION

It is the object of this invention to convert a pulse train having a rate proportional to the rotational velocity of the wheel into a binary number, with the binary number being reset to zero when a wheel locks up suddenly. In this process the value of the binary number is being corrected all the time of a rapid clock pulse rate, as required by anti-skid control systems.

This object is achieved by the characteristic features set forth in claim 1 below. Specifically, a wheel sensor of the ordinary type produces a pulse train which is proportional to the rotational velocity of the vehicle wheel and the device of this invention is used to convert that pulse train into a binary number for use in a digital computer as a part of an anti-skid system. The pulse train is applied to a comparator, an output of comparator is coupled to the input of a storage register which cumulatively adds to its contents, taking into consideration the sign of the input signal. A frequency generator controlled in dependence on the contents of the storage register produces a comparison pulse train which is also supplied to the comparator. The comparator is adapted to establish a difference between the frequency of the two pulse trains in the form of a binary number. The thus produced binary number is supplied to the register so that the content of the register represents a binary number corresponding to the frequency. The comparator and the register are controlled by a clock pulse generator.

The advantages of the device constructed in accordance with this invention are that a binary number indicative of the pulse rate and consequently of the rotational wheel velocity is available at any time, said number being corrected whenever a clock pulse occurs. Since a connected computer will as a rule also operate with a clock pulse and since it will therefore be expedient to use the same clock, each operational cycle of the computer has available a fully updated binary number for its use. By virtue of the inventive design, it is ensured that no operating state can occur during which the binary number is not adjusted to the actual state of wheel rotation. A particular advantage of the device of this invention lies in the extremely simple design of the device embodying the invention.

Further advantageous embodiments of the principle of this invention provide for rapid correction of the binary number generated through the use of additional stabilization elements. This permits the device to be assembled from individual elements which are particularly simple and accordingly insusceptible to trouble, as well as being inexpensive.

BRIEF DESCRIPTION OF THE DRAWINGS

Further advantages of the device of this invention will become apparent from the following description of the embodiments and the accompanying drawings in which.

DESCRIPTION OF THE PREFERRED EMBODIMENT

Figure 1:
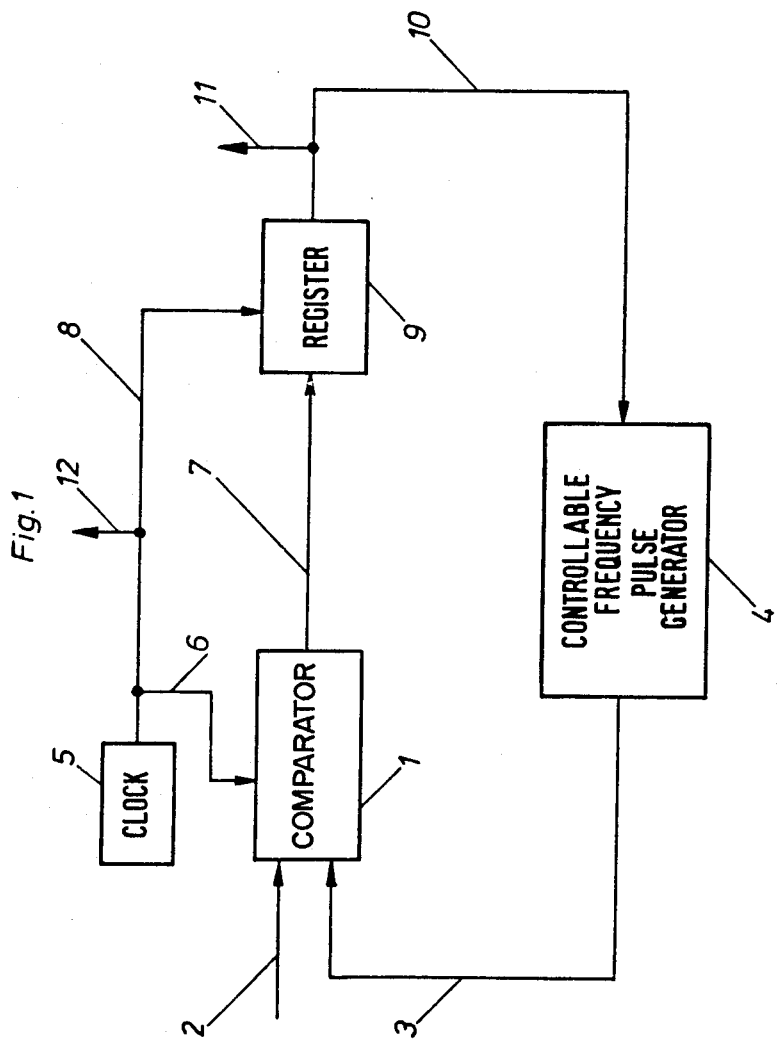
FIG. 1 is a block diagram illustrating an embodiment of this invention.

Referring to FIG. 1, a comparator 1 is provided to which a pulse train designated by arrow 2 is applied. The pulse train originates from an inductive rotational velocity pick-up which is not illustrated. The comparator receives through line 3 a comparator pulse train from a controllable frequency pulse generator 4. In the transient state of the inventive device in FIG. 1, the comparator pulse train corresponds to the pulse train arriving from the inductive rotational velocity pick-up.

A clock generator 5 provides clock pulses to comparator 1 via interconnecting line 6. Whenever a clock pulse occurs, the comparator 1 will execute a comparison function between the incoming input pulse train and the comparison pulse train. The difference between these two pulse trains is then passed to register 9 via line 7 in a binary form. Register 9 is so designed that it always adds the binary number it receives from line 7 to its stored contents at the same time also considering the sign. Through line 8, the clock pulse is also supplied to register 9 so that on each clock pulse received, the register content is transferred via line 10 to the controllable frequency generator 4 with the register 9 contents being neither deleted or changed. Through a line 11 which branches off from line 10 or which may be directly coupled to an output of register 9 the binary number, which is present on line 2 and is indicative of the frequency of the pulse train, will be passed to a computer (not shown). Through line 12 which is connected to clock generator 5 the clock pulse also will be transferred to the computer.

The binary number applied to frequency generator 4 through line 10 will cause it to generate a comparison pulse train, the frequency of which is proportional to the frequency of the binary number and thus corresponds to the frequency of the rotational velocity of the pick-up represented by the binary number. As has been mentioned before this comparison pulse train will be supplied through line 3 to comparator 1 in addition to the pulse rate produced by the rotational velocity pick-up.

The mode of operation of the device illustrated in FIG. 1 can be generalized as follows: Proceeding from the simple case that the rotational velocity of the wheel does not change for a period of time, the device illustrated in FIG. 1 will be in the transient state. In this case the rotational velocity pick-up will provide a pulse train the rate of which will not change by virtue of the constant rotational velocity of the wheel. The contents of register 9 will thus have reached a value corresponding to that pulse rate. The binary number transferred to frequency generator 4 from register 9 whenever a clock pulse occurs will cause the frequency generator 4 to generate a comparison pulse train the rate of which corresponds to the rate of the pulse train generated by the rotational velocity pick-up. Thus the number of pulses arriving via lines 2 and 3 at comparator 1 within a clock period is, in this example, always the same. Comparator 1 does not determine the difference between pulse train and the comparison pulse train which would arrive at register 9 via line 7. The contents of register 9 are thereby unchanged, retaining their original value, so that also the frequency generator 4 continues generating the comparison pulse train at the same rate. Via line 11, the computer thus receives always the same binary number indicative of the rotational wheel velocity.

When a change in the rotational wheel velocity occurs for any reason whatsoever, the frequency of the pulses generated by the rotational velocity pick-up will likewise change. The comparator 1 will determine the degree of rotational velocity variation since the comparison frequency of the comparison pulse train cannot yet change at this time. The difference established by comparator 1 is applied to register 9 via line 7, thereby correcting its contents. The corrected register 9 contents, which are adjusted to the changed rotational behavior of the wheel, are then supplied to the frequency generator via line 10 and to the computer via line 11 as a new binary number representing the wheel rotational velocity. Also the frequency generator will thus adjust the comparison pulse train it produces to the pulse train produced by the rotational velocity pick-up.

As will be readily apparent from the above, the binary number transferred from register 9 to the computer via line 11 is always adjusted to the actual wheel rotational velocity whenever a clock pulse occurs. If in this process the selected rate of the clock generator is higher than the rate generated by the rotational velocity pick-up, which is possible without difficulty, there results a hitherto inconceivable rapidity in the correction of the binary number representing the rotational velocity.

Moreover, unlike prior art devices, the device as illustrated in accordance with this invention as illustrated in FIG. 1 provides that register 9 does not permanently hold a wrong value when the wheel locks up suddenly which causes the pulse rate of the rotational velocity pick-up to go to zero. Also in this case, the difference determined by the comparator by means of the clock pulse will cause the register contents to be reset to zero, thereby also causing the binary number presented on line 11 to be equal to zero.

Figure 2:
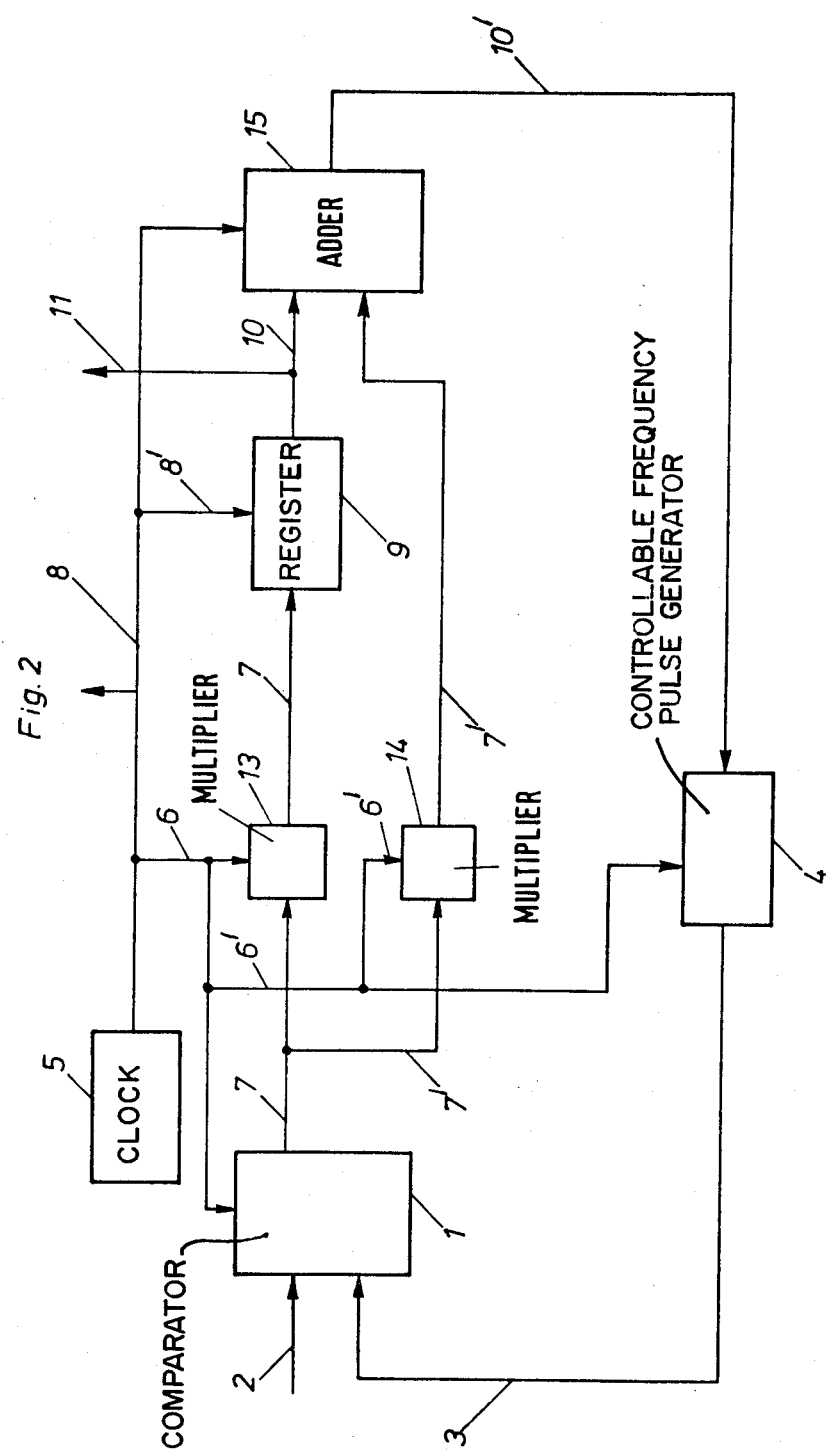
FIG. 2 is a block diagram illustrating the device of this invention constructed in accordance with the principles of this invention and including stabilizer elements.

In the embodiment of FIG. 2, similar elements have been assigned the same reference numerals as in the preceding embodiment illustrated in FIG. 1 and, since the basic circuit is the same, such elements need not be explained further. The principle differences between the embodiment of FIG. 1 and the embodiment of FIG. 2 consists in that a multiplier 13 is interposed in line 7 between comparator 1 and register 9. The multiplier 13 multiplies the difference between the pulse train and the comparison pulse train as determined by comparator 1 by a constant factor. From this there results that the digit capacity of register 9 can be selected freely. The only requirement being that the constant factor of multiplier 13 must be co-ordinated with the capacity of register 9. Thus, the binary number arriving in the computer via line 11 can be adapted to the requirements of the computer as to its digit capacity. Another difference of the embodiment illustrated in FIG. 2 with respect to FIG. 1 consists in that a line 7' branches off from line 7 between comparator 1 and multiplier 13 and leads to an adder 15 via a second multiplier 14. Adder 15 further connects with register 9 through line 10. The output of adder 15 is in turn coupled to frequency generator 4 via line 10'.

By means of the second multiplier 14 and the adder 15, there is produced a difference between the pulse train of rotational velocity of the pick-up and the comparison pulse train as determined by comparator 1 which is additionally supplied to frequency generator 4 amplified by the factor of the second multiplier 14. This device enables the frequency generator 4 to adjust the comparison pulse train to the changed pulse train of the rotational velocity pick-up more rapidly with the result that the tendency to oscillation, which is always present in such circuits, is suppressed and that the inventive device reaches its steady state more rapidly. This will have a positive effect particularly if the rate of the clock generator 5 is substantially higher than the highest possible rate of the rotational velocity pick-up.

Figure 3:
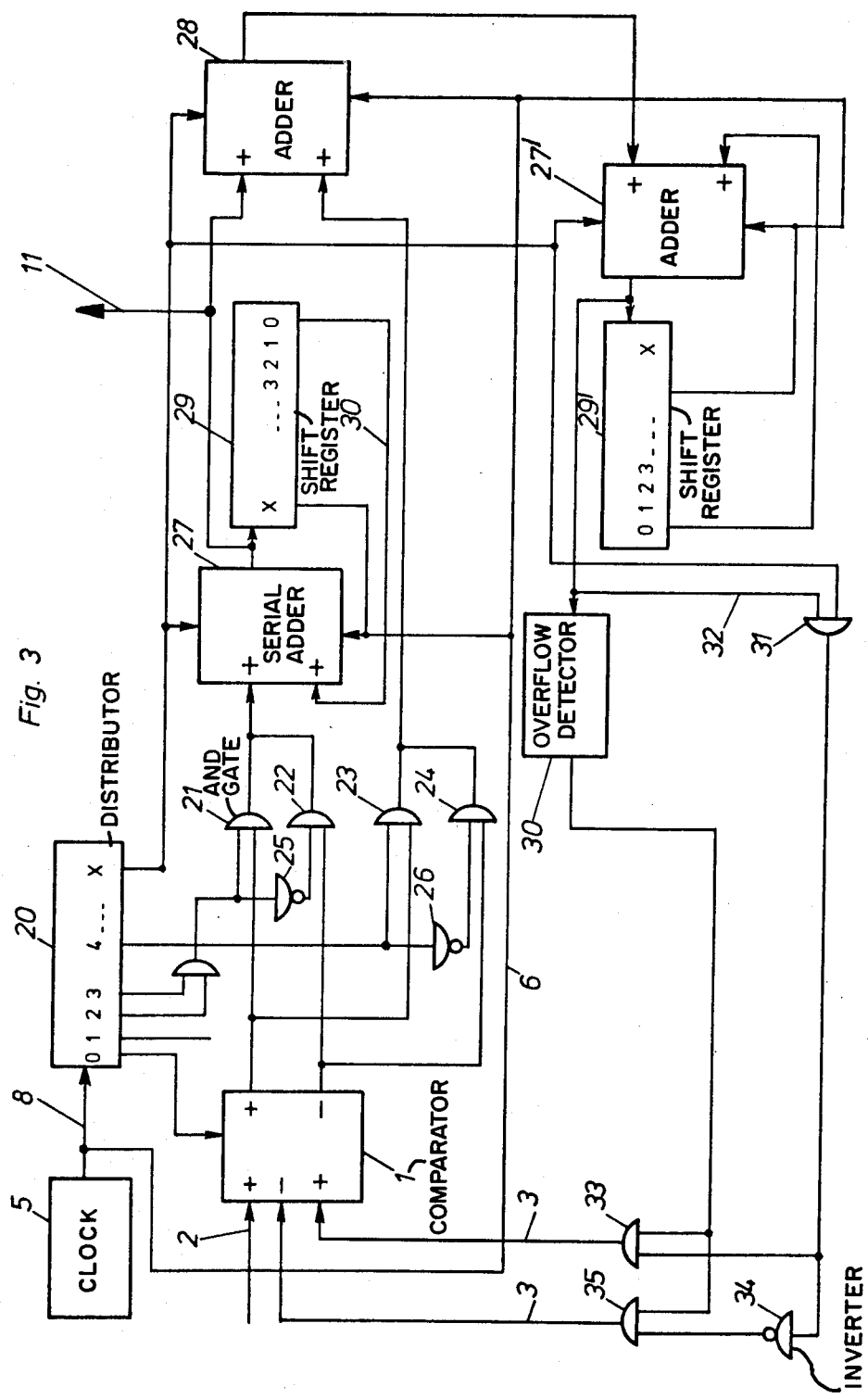
FIG. 3 is a circuit diagram of the device in accordance with this invention embodying particularly simple individual elements.

FIG. 3 illustrates a circuit diagram embodying the inventive device involving the device of this invention which utilizes particularly inexpensive, serially operating elements. It is to be appreciated particularly that such elements permit a situation in which the frequency generator 4 is constructed from a simple adder and a shift register with overflow capability. Because of the utilization of serial computation techniques, all adders used require a capacity of no more than one bit and must provide for the carry function. The only precondition which must be satisfied in such a design of the inventive device is that the clock rate must be higher than the highest possible rate generated by the rotational velocity pick-up.

The embodiment of FIG. 3 provides again for a clock generator 5 which generates a master clock pulse the rate of which is an integer multiple of the clock rate, with the ratio between master clock pulse rate and the clock pulse rate being dependent on the digit capacity of the system as will be explained below. The master clock pulse generated by clock generator 5 is supplied through line 8 through a distributor 20 which distributes the master clock pulse among the lines to which set values between O and X are assigned in such a manner that the first master clock pulse of a computation cycle is present on the O line, and any subsequent master clock on any subsequent set value line. When the set value X line is reached, the computation cycle is terminated and the next master clock pulse will be applied to the O line. The O line predetermines at the same time the clock pulse rate. It will be evident from this that the clock pulse rate is equal to the master clock rate produced by clock generator 5 divided by $X+1$. Moreover, the O line represents, in the binary numbers, the digit 2°, i.e. the least significant bit of the whole arrangement. In the form of this invention illustrated in the embodiment of FIG. 3, the device provides that the most significant bit which is represented by the line X contains the sign. Assuming the instance in which the whole arrangement is to have a capacity of 10 bits, the binary number will be able to assume a value between −512 and +511, thereby providing for a total of 1024 possible alternatives.

Comparator 1 is designed as a three step incrementing and decrementing element having 3 signal inputs and 2 signal outputs. Two signal inputs are positive for incrementing and the third signal input is negative for decrementing. Of the signal outputs, one is positive and the other negative. Comparator 1 is able to receive 3 signal states depending on how many clock pulses are presented at which input at the time of a clock pulse. In the serial computation technique, these input pulses are produced by current or voltage pulses which are defined as a logical 1.

Before continuing with the description it should be understood in this connection that such a circuit permits only two states to be represented on a line; either there is current or voltage present, which then corresponds to a logical 1 or there is no current or voltage present which indicates a logical 0. Therefore, comparator 1, which is to assume three switching states, has two outputs, a positive and a negative output. When considering the mode of operation of the comparator and assuming that it is in the 0 state, i.e., no signal is present at either output, it will be switched into the +1 state when the next sequential input pulse is applied to a positive input, i.e., a signal will then be present at the positive output. When the next sequential input pulse is supplied to the negative input, comparator 1 will return to the 0 state so that neither of its outputs will have a signal. If another negative pulse arrives, the comparator will switch to the 1 switch, i.e,. a signal will be present at its negative output. When the comparator is in the +1 or the −1 state and an input signal arrives which should cause it to become more positive or negative, its output will remain unchanged. In addition, a clock pulse input of comparator 1 is coupled to the 0 line so that an output signal of comparator 1 can only be changed if a clock pulse arrives which is predetermined by the 0 line.

The positive output of comparator 1 is coupled to an input of a serial adder 27 via a gating circuit 21 which is designed as an AND gate. The set value lines 2 and 3 connect with the second input of gating circuit 21. Since a signal, if any, is present at the positive output of comparator 1 over the whole duration of a clock pulse, the gating circuit 21 will transfer such a signal to adder 23 only with the set values 2 and 3. By means of these set values 2 and 3, the adder 27 thus receives the binary number +12. In the same manner the negative output of comparator 1 is coupled to the input of adder 27 through a gating circuit 22 which is likewise designed as an AND gate the second input of which is supplied by the inverted signal of set value 2 and 3 lines provided at the output of inverter 25. Thus the binary number in this case presented to adder 27 represents the value −13.

The difference between the absolute values of the binary numbers presented to adder 27 on the two channels does not matter since the operating cycle is executed very rapidly; a difference between positive and negative value is therefore of no consequence as the occurrence of a minor error will be corrected in the next sequential cycle.

Similarly, the positive and negative output of comparator 1 is coupled to an adder 28 through gating circuits 23 and 24. Gating circuit 23 is coupled to the set value 4 line while gating circuit 24 is coupled to inverted set value line 4 due to the inverter 26. Gating circuit 23 thus supplies to the one input of adder 28 the binary number +16, while the gating circuit 24 supplies the binary number —17. In this case, also the two absolute values differ from each other by the value 1 as a consequence of the inversion of set value 4 line. Adder 27 forms, together with shift register 29, the storage register. The input of shift register 29 is coupled to the output of adder 27. The least significant digit position of the shift register is connected to a second input of adder 27 through a return line 30. In this arrangement, adder 27 has a carry function, i.e., if a logical 1 is present at both inputs, the output will become a logical 0, and a logical 1 will be stored for the next position, i.e., for the next computation step which is triggered by the master clock. Since, as was just mentioned, adder 27 adds the two inputs when a master clock occurs, it is directly coupled to clock generator 5 via a line 6. Similarly, shift register 29 connects with the clock generator 5 through line 6. In addition adder 27 has a reset input for the carry function which is coupled to the set value X line to avoid that a carry is transferred to the next cycle which would produce a wrong result in this next cycle. As mentioned above, the output of adder 27 is coupled to the input of shift register 29. Simultaneously, the output of adder 27 is also coupled to adder 28.

Adder 28 also operates with the master clock pulse and is therefore connected to clock generator 5 through line 6. Similar to adder 27, it has a carry function and for this purpose a reset input which is coupled to the set value X line. The output of adder 28 is applied to adder 27' which cooperates with shift register 29' in the same manner as adder 27.

The output of adder 27' is coupled to the input of shift register 29' and connects with an overflow detector 30 which determines the overflow of shift register 29'. Detector 30 issues an output pulse whenever shift register 29' exceeds its upper or lower capacity limit. It will be readily understood that in this case the contents of shift register 29' will change to the binary number of its opposite capacity limit.

Further, adder 27' is output coupled to a gating circuit 31 through line 32. Gating circuit 31 is designed as an AND gate with its second input being coupled to the set value X line. Since as was mentioned above, the most significant bit of the shift register defines the sign. A pulse will appear at the output of gating circuit 31 if the contents of shift register 29' are negative. The output of gating circuit 31 is directly supplied to a gating circuit 33 and inverted by an inverter 34 to be supplied to a gating circuit 35. The second input of each gating circuit 33 and 35, both of which are AND gates, receives the output pulse of detector 30 indicating the overflow of shift register 29'. The output of gating circuit 35 is coupled to the negative input of comparator 1, while the output of gating circuit 33 is coupled to a positive input of comparator 1. The pulse train produced by the rotational velocity pick-up is applied to the second positive input of comparator 1. Prior thereto, this pulse train has been converted into counting pulses.

In reviewing the overall function of the device, let us first have a look at the steady state in which no output signal appears at comparator 1. In this state the register 29 will hold a binary number indicative of the wheel rotation velocity. With each clock pulse computer this binary number will be added to the contents of register 29. Considering the case that the wheel rotational velocity is very low, a predetermined number of clock pulses will occur during the period between the occurrence of two successive pulses from the rotational velocity pick-up. In spite of the low significant binary number held in shift register 29 at slow wheel rotational velocities, this number of clock pulses will cause, due to the frequency cumulative adding operations in shift register 29', an overflow of shift register 29' with positive sign so that by means of element 30 and gating circuits 31 to 35 a comparison pulse will be supplied to the negative input of adder 1 together with the next sequential pulse arriving from the rotational velocity pick-up. Thus, comparator 1 is not in a position to determine a difference so that neither of its outputs will provide a signal and the same cycle will be restarted.

Considering the case that the wheel rotates at a velocity twice as high as in the previous case, only half of the previous number of clock pulses will occur between two successive pulses of the rotational velocity pick-up. However, as in this case the binary number in shift register 29 is twice as high as before, already half the number of clock pulses will cause an overflow of shift register 29'.

In the two cases just mentioned the adjusting behavior of the invention was intentionally disregarded to make its principle mode of operation more readily understood. Considering now at the case that the pulse rate produced by the rotational velocity pick-up changes, a signal will appear at the positive output of comparator 1 if it increases, and at the negative output of comparator 1 if it decreases. This will provide for correction of the binary number in shift register 29 through gating circuit 21 or 22 and adder 27. This correction will be effected in like steps which are predetermined by gating circuits 21 and 22. However, in order to achieve a rapid adjustment of the binary number when there is an abrupt, marked change in this pulse rate, an additional binary number is applied to shift register 29' via gating circuits 23 and 24 and adder 28 within a cycle during which an output signal is present at comparator 1. It is achieved by this method that the device reaches the steady state more rapidly.

It will be understood by those of skill in the art that the ratio of the binary numbers at the outputs of gating circuits 21, 22 and 23, 24 were given as an example with respect to the device as illustrated in FIG. 3 and are not optimal for each case. It will also be appreciated that it will be necessary to adapt this ratio to the individual operating conditions encountered. For use in an anti-skid control device, it will appear expedient to couple gating circuit 21 to the set value 0 line and thus to apply to adder 27 the binary digit 1. In this case, the negative output of comparator 1 will be directly coupled to the input of adder 27 without gating circuit 22 being interposed so that no difference would result between the positive and negative value. In respect to gating circuits 23, 24 it would appear to be expedient to connect them with the set value 7 line if the capacity of the shift register is 10 bits and if the clock rate is about double the highest possible pulse rate of the rotational velocity pick-up. It is further to be understood, however, that these values will have to be determined by subjecting the device to optimization tests.

While the device of this invention has been described in relation to specific embodiments, it will be appreciated by those skilled in the art that modifications may be made without departing from the spirit and scope of the appended claims.

What is claimed is:

1. A device for converting the rate of a pulse train which is proportional to the rotational velocity of a vehicle wheel into a binary number for use in a digital computer for anti-skid control systems including:
- a comparator;
- means for supplying said pulse train to said comparator;
- means coupling the output of said comparator to the input of a storage register which cumulatively adds said pulse train to the contents of said storage register, taking into account the sign of the output signal of said comparator;
- a controllable frequency pulse generator coupled to said storage register to be controlled by the contents of said storage register for producing a comparison pulse train;
- means coupling said frequency generator to an input of said comparator whereby said comparator is adapted to provide the difference between the frequency of said two pulse trains in the form of a binary number, said binary number being supplied to said storage register whereby the contents of said storage register represent the binary number corresponding to said frequency; and
- a clock pulse generator for controlling said comparator and said storage register.

2. The device as set forth in claim 1 wherein the pulse rate of said clock pulse generator is greater than the greatest pulse rate to be converted into a binary number.

3. The device as claimed in claim 1 wherein said binary number at the output of said comparator is limited to a maximum value which is either plus or minus 1.

4. The device as set forth in claim 1 wherein said frequency generator comprises a limited capacity register which adds the binary number present at the output of said storage register during the respective clock pulse and compares the pulse rate to its stored content, with the content of said limited capacity register being adapted to be set to opposite capacity limit when its capacity limit is reached whereby at the same time a comparison pulse is supplied to said comparator.

5. The device as set forth in claim 1 including a first constant factor multiplier means positioned between the output of said comparator and the input of said storage register.

6. The device as set forth in claim 5 wherein a second constant factor multiplier means is connected to the output of said comparator and wherein an adder is provided which is coupled to the output of said storage register and an output of said second multiplier and the output of said adder is connected to a second register.

7. The device as set forth in claim 6, wherein the output of said register is coupled to a sign detector means adapted to open when the binary number present has a positive sign, gating circuit means are provided governing the negative input to said comparator and when the binary number present has a negative sign, a further gating circuit governing the positive input of said comparator and further including means for supplying a comparison pulse to both said gating circuits.

8. A device as set forth in claim 1, wherein said storage register comprises two shift registers having like digit capacity and wherein serial adders are provided including carry function connected before said two shift registers whereby a comparison pulse is generated by a second of said two registers and further wherein a master clock pulse is provided for all elements jointly, the rate of which is a multiple of the clock pulse rate, which multiple corresponds to the digit capacity of said two registers whereby each master clock pulse is assigned a certain set value and in that the sign is defined by the most significant set value.

9. The device as set forth in claim 8 wherein means are provided so that each master clock pulse of a certain set value provides for opening said gating circuits to which said certain set value is assigned and wherein said clock pulse is the master clock pulse for the set value 0.

10. The device as set forth in claim 9 wherein said comparator has a positive and a negative output and including means whereby an output signal can only be changed with said clock pulse and wherein both outputs are coupled to a first of said two registers and an adder via gating circuit means which perform as multipliers and wherein the constant multiplication factor is provided by opening said gate circuits by means of the master clock pulse having the same set value.

* * * * *